(12) United States Patent
Sutton (10) Patent No.: US 12,313,198 B2
(45) Date of Patent: May 27, 2025

(54) HOSE CONNECTORS (71) Applicant: Mulch Unlimited, Inc., Mechanicsville, VA (US)

(72) Inventor: James Sutton, Mechanicsville, VA (US)

( * ) Notice: Subject to any disclaimer, the term of this patent is extended or adjusted under 35 U.S.C. 154(b) by 0 days.

(21) Appl. No.: 18/466,960

(22) Filed: Sep. 14, 2023

(65) Prior Publication Data

US 2025/0092977 A1    Mar. 20, 2025

(51) Int. Cl.
*F16L 33/10* (2006.01)
*F16L 25/08* (2006.01)
*F16L 37/084* (2006.01)
*F16L 37/18* (2006.01)

(52) U.S. Cl.
CPC ............ F16L 33/10 (2013.01); F16L 37/084 (2013.01); F16L 25/08 (2013.01); F16L 37/18 (2013.01)

(58) Field of Classification Search
CPC . F16L 25/06; F16L 25/08; F16L 33/10; F16L 37/146; F16L 37/18; F16L 37/12; F16L 33/30; F16L 37/084
See application file for complete search history.

(56) References Cited

U.S. PATENT DOCUMENTS

| 25,283 | A | * | 8/1859 | Smith | |
|---|---|---|---|---|---|
| 760,710 | A | * | 5/1904 | Simpson | |
| 856,401 | A | * | 6/1907 | Hannold | |
| 883,941 | A | * | 4/1908 | Eagan | |
| 1,252,660 | A | * | 1/1918 | Clay | |
| 1,261,687 | A | * | 4/1918 | Brandon | F16L 37/18 |
| 4,230,347 | A | * | 10/1980 | Williams | F16L 25/08 |
| 4,254,973 | A | * | 3/1981 | Benjamin | F16L 37/18 |
| 4,479,669 | A | * | 10/1984 | Hynes | F16L 25/08 |
| 5,797,627 | A | * | 8/1998 | Salter | F16L 37/084 |
| 6,447,028 | B1 | * | 9/2002 | LaMarca | F16L 25/08 |
| 9,347,592 | B2 | * | 5/2016 | Stead | F16L 25/08 |
| 2013/0049360 | A1 | * | 2/2013 | Wolff | |

FOREIGN PATENT DOCUMENTS

KR    2006114727 A  * 11/2006

OTHER PUBLICATIONS

KR-2006114727-A—Machine Translation—English (Year: 2006).*

* cited by examiner

*Primary Examiner* — William S. Choi
(74) *Attorney, Agent, or Firm* — Bernard G. Pike; Pike IP Law, PLLC (57) ABSTRACT

To complete a transfer of solid material such as mulch, multiple hoses may have to be connected together, therefore, such hoses have hose connection fittings attached at their ends. A hose connector has a male fitting connected to a first hose and a female fitting connected to the second hose. The male fitting may be inserted into the female fitting and the two fittings are secured together thereby connecting a first hose to a second hose. The hose connector has a locking assembly consisting of set screw, a radial hole defined in the female fitting, and a recess for receiving the set screw in the male fitting.

14 Claims, 5 Drawing Sheets

Cup Point

HOSE CONNECTORS

FIELD OF THE INVENTION

Solid material off loading and material transfer operations may require hoses for conveying the solid material from a truck, trailer, or other container to a different storage or use location. These material transfer operations may require using two or more hoses to be connected together to provide sufficient length to complete the transfer.

BACKGROUND

Solid materials may be transported by trucks or trailers, for example, and off loaded at a new location. The solid materials may be blown through and conveyed within hoses. These trucks and trailers may be used for delivery of sand, wood pulp, food products such as grains, rice, dry beans, and mulch and woodchip material for distribution in landscaping applications, for example. Many of these trucks and trailers have a V-bed design which has relatively wide opening at the top through which material can be loaded into the truck or trailer and a narrower bottom portion for controlled off-loading.

To more efficient delivery and application of mulch, mulch may flow from the bottom outlet of a truck or trailer and be entrained in stream of air through a hose to the desired application area. A mulch blowing truck provides significant advantages over delivery and the manual distribution of mulch. For example, mulch can be applied twice to ten times faster by blowing mulch on the desired location than by manual applying it. Further, mulch blowing processes can easily apply mulch to locations 300 feet away from the delivery truck or trailer or more with the proper equipment. For example, mulch delivery hoses (typically four inch diameter or five inch diameter hoses) may be coupled together to provide the required distance.

However, there are problems with conventional mulch blowing equipment. Unfortunately, conventional hose connectors were not designed for difficult service of mulch service. Mulch can easily clog restriction points caused by these connectors and the conventional connectors were not designed to withstand the abuse of being dragged along the ground, over curbs and walls, through concrete or asphalt parking lots and driveways, and over and past other hard scape or natural landscaping. Further, conventional hose connectors comprise components that extend beyond the outer wall of the connector and sharp corners of these connector may hang up on the curbs, walls, other hard scape and natural landscape. This abuse can break and wear conventional hose connectors (designed for mostly static operations) and causes delays while operators have to move the connector off and beyond these obstacles or replace damaged or leaking connectors.

There exists a need for a hose connector designed specifically for mulch delivery and other dynamic, high abuse applications application that resists clogging, damage, and getting stuck on obstacles.

SUMMARY

Mulch provides benefits to a garden while also adding to the beauty to the landscape. For efficient application, mulch or other materials may be conveyed in air from a delivery truck or trailer through a hose to the area where the mulch is to be applied. To extend the reach and provide efficient application by the mulching crew, multiple hoses may be connected together with hose connectors to obtain the desired length.

In one embodiment, a hose connector may comprise a male fitting connected to a first hose and a female fitting connected to the second hose. The male fitting may be inserted into the female fitting and the two fittings are secured together thereby connecting a first hose to a second hose. Once connected the fittings provide longitudinal through holes in fluid communication with the hoses so the mulch or other solids may be conveyed from the first hose to the second hose, etc. and expelled from the hose to the application area.

In such an embodiment, the male fitting defines a male longitudinal through hole for conveying solid material and air. The male fitting may also comprise a male coupling portion and a first hose connection portion, wherein the coupling portion defines a recess as part of a fitting locking assembly. The first hose connection portion may be received within the first hose to connect the first hose to the male fitting.

A corresponding female fitting defines a female longitudinal through hole for conveying the solid material and air. The female fitting further comprises a second hose connection portion and a female coupling portion to receive the corresponding male coupling portion. The female fitting may also define a radial through hole through a wall of the female fitting that forms another portion of the fitting locking assembly. The second hose connection portion may be received within the second hose to connect the second hose to the female fitting. The male and female longitudinal through holes are in fluid communication with the hoses.

In one embodiment, the fitting locking assembly comprises a locking member configured to be received through the radial through hole of the female fitting and into the recess in the male fitting thereby fastening the male fitting to the female fitting to prevent longitudinal movement of the male fitting out of the female fitting. The hose connector may comprise one or more fitting locking assemblies.

In one embodiment, the hose connector consists of one locking assembly. For example, the one locking assembly consists of the set screw threaded in the radial through hole with a least a portion of the set screw received with the recess in the male fitting. Surprisingly, one locking assembly is sufficient to retain the male fitting to the female fitting during use, such as applying mulch through a set of connected hoses. In other embodiments, the hose connector may comprise two, three, four, or more locking assemblies, for example.

In an embodiment, the recess in the male fitting is a circumferential recess around the male coupling portion to ease locking the male and female fittings together.

The locking member may be at least one of a bolt, a screw, a set screw, spring biased pin, a rod with a friction or interference fit, or a twist lock fitting. In a specific embodiment, the locking member is a set screw and the radial through hole is a threaded radial through hole. The set screw may be threaded through the radial through hole with a least a portion of the set screw received with the recess in the male fitting and the head of the set screw within the radial through hole. In such an embodiment, the set screw does not protrude from the radial through hole after locking the male fitting to the female fitting.

In still a further embodiment, the hose connection does not comprise any exposed right angles or other features to reduce the tendency of the hose connector to catch on obstacles as the hoses and hose connection are dragged along the ground, over curbs and walls, and past other features during use.

The hose connection may have a raised central portion that has sloped transitional segments that allow the hose connector to move past obstacles without becoming hung up.

In order to make the above objectives, features and advantages of the present invention more obvious and understandable, the specific embodiments of the present invention will be described in detail below with reference to the accompanying drawings. In the following description, many specific details are explained in order to fully understand the present invention. However, the present invention can be implemented in many other ways different from those described herein, and those skilled in the art can make similar improvements without departing from the connotation of the present invention. Therefore, the present invention is not limited by the specific embodiments disclosed below.

In the description of the present invention, it should be understood that the terms "center", "longitudinal", "transverse", "length", "width", "thickness", "upper", "lower", "front", "Back", "Left", "Right", "Vertical", "Horizontal", "Top", "Bottom", "Inner", "Outer", "Clockwise", "Counterclockwise", "Axial", "Radial", "Circumferential", etc. indicate the orientation or positional relationship based on the orientation or positional relationship shown in the drawings, and are only for the convenience of describing the present invention and simplifying the description, rather than indicating or implying the pointed device or the element must have a specific orientation, be constructed and operated in a specific orientation, and therefore cannot be understood as a limitation of the present invention.

In addition, the terms "first" and "second" are only used for descriptive purposes and cannot be understood as indicating or implying relative importance or implicitly indicating the number of indicated technical features. Therefore, the features defined with "first" and "second" may explicitly or implicitly include at least one of the features. In the description of the present invention, "plurality" means at least two, such as two, three, etc., unless otherwise specifically defined.

In the present invention, unless otherwise clearly specified and limited, the terms "installed", "connected", "connected", "fixed" and other terms should be understood in a broad sense, for example, "retained," it can be a fixed connection or a detachable connection. For those of ordinary skill in the art, the specific meaning of the above-mentioned terms in the present invention can be understood according to specific circumstances.

Aspects of the connector are presented in various embodiments, however one skilled in the art will understand various variation and interchangeability of the components of the various embodiments which are intended to be included in the scope of the invention.

DESCRIPTION

Solid materials may be delivered from trucks, trailers, or other storage tanks and conveyed from the truck or trailer to the desired location by entraining the solid material in an air stream through one or more hoses. For example, garden mulch may be delivered and applied by conveying the mulch through a hose. For mulch, the hoses are typically four inch or five inch diameter hoses.

Mulch delivery crews arrive at a job site with a truck or trailer loaded with mulch. Upon arrival, the crew may have to assess the delivery requirements of the location and gather, and possibly connect, the hoses that are needed to complete the job. Hoses that are typically carried on the truck or trailer to the job site are in fifty to one hundred foot sections. To achieve, these hoses may be connected to obtain the length needed efficiently apply the mulch as required. Since the hoses need to be connected, the hoses will require some type of hose connector at the end of the hose.

Once the hoses are connected as desired, the connected hoses are dragged around the job site as the mulch is applied. Conventionally, dragging the connected hoses around the job site has been difficult because the conventional hose connectors get caught on obstacles or dig into the turf causing delays in the application of the mulch and broken connectors. For example, the most common prior art hose connectors have a male fitting and a female fitting wherein the female fitting 100 has ears 101 with cam 102 locks. See FIG. 1. The male fitting is inserted into the female fitting and the ears are rotated (to the position shown in FIG. 1) to cause the cams to protrude into the interior of the female fitting and lock the male fitting and female fitting together.

Figure 1:
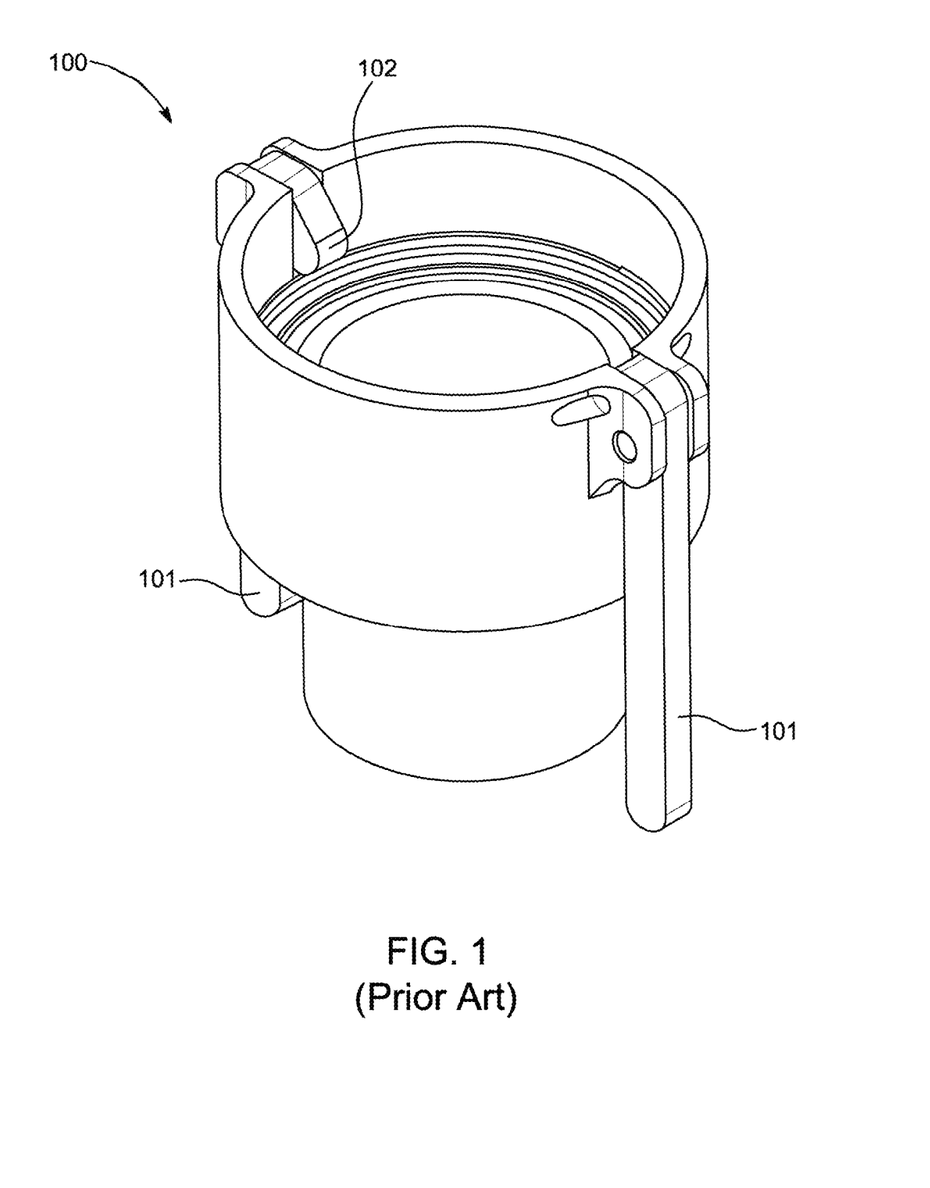
FIG. 1 depicts a prior art hose connector that has a female fitting with a cam lock locking member extending beyond the surface of the fitting and square edges that hang up or damage.

The ears 101 of these conventional hose connectors tend to hang up on driveways, sidewalks, walls, turf, and tree roots, for example. Further, the ears may be difficult to rotate and lock down due to damage or interference due to foreign objects, therefore workers may hit them with hammers or otherwise apply too much force on the ears causing them further damage or to break. In all cases, the ears inevitably break or are worn down to make them inoperable and the fittings need to be replaced.

Further, these conventional hose connectors have sharp edges characterized by approximately ninety-degree angles or steps and do not comprise sloped transition portions to ease movement over the turf or past obstacles. In addition to these operational interruptions, the couplings are bulky and heavy leading to fatigue in workers and reduced productivity.

Figure 5:
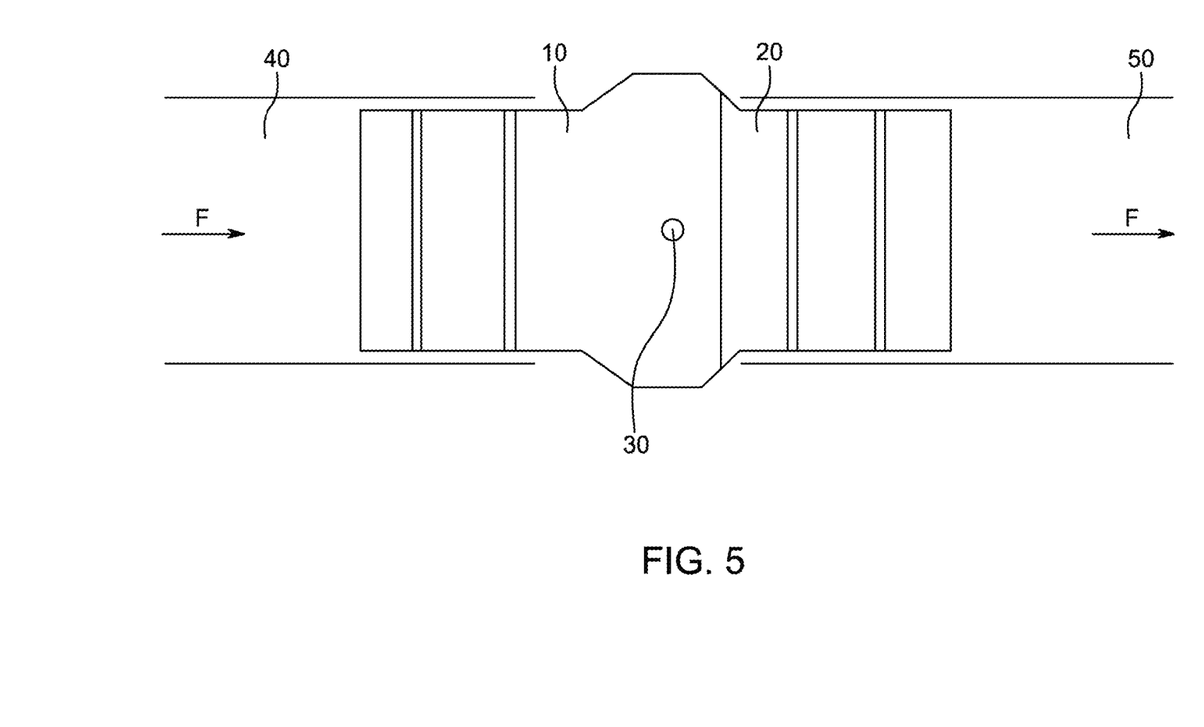
FIG. 5 depicts two hoses connected with an embodiment of the hose connector.

Embodiments of the hose connector of the invention reduce worker fatigue, worker frustrations, and damage to customer property on a job site while also improving delivery efficiency. As shown in FIG. 5, in one embodiment, a hose connector may comprise a male fitting 20 connected to a first hose 50 and a female fitting 10 connected to the second hose 40. The male fitting 20 is inserted into the female fitting 10 and the two fittings are secured together by a locking assembly comprising a locking member 30. Once connected the fittings provide a series of longitudinal through holes in communication with the offloading hoses and the outlet of the truck or trailer so that the mulch or other solids may be conveyed from the truck through the first hose to the second hose as shown by arrows F in a flowing air stream.

Figure 2:
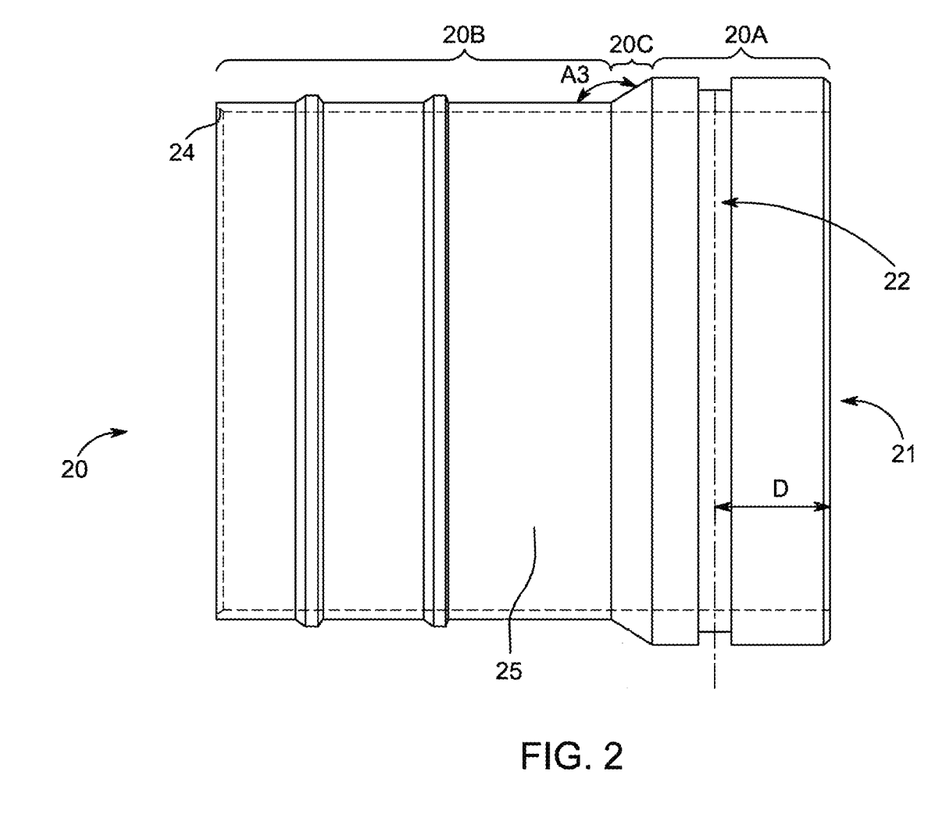
FIG. 2 depicts an embodiment of a male fitting of a hose connector with a recess for receiving a locking member and male transition portion between the hose connection and the raised central portion.

In an embodiment shown in FIG. 2, the male fitting 20 defines a male longitudinal through hole 21. The male fitting 20 may also comprise a male coupling portion 20A that is inserted into the female fitting 10 and a first hose connection portion 20B. In this embodiment, the male fitting 20 comprises a male transition portion 20C between the male coupling portion 20A and the first hose connection portion 20B. The male transition portion 20C provides a sloped transition to reduce the possibility of the hose connector hanging up or damaging obstacles or turf. Angle A3 defines the slope of the male transition portion 20C and the first hose connection 25 on the male fitting 20. The first hose connection portion 20B may be received within the first hose to connect the first hose to the male fitting 20. Both the first hose connection portion 20B and the second hose connection portion 10B may have ribs 12A and 12B. The ribs 12A and 12B may help retain the hoses on the hose connection portions. The ribs may further comprise a first sloped edge 12C and a second sloped edge 12D. The second sloped edge 12D is steeper than the first sloped edge 12C is to ease insertion of the hose connection portion into a hose and also retain the hose and seal the connection point so pressurized air does not leak.

Figure 3:
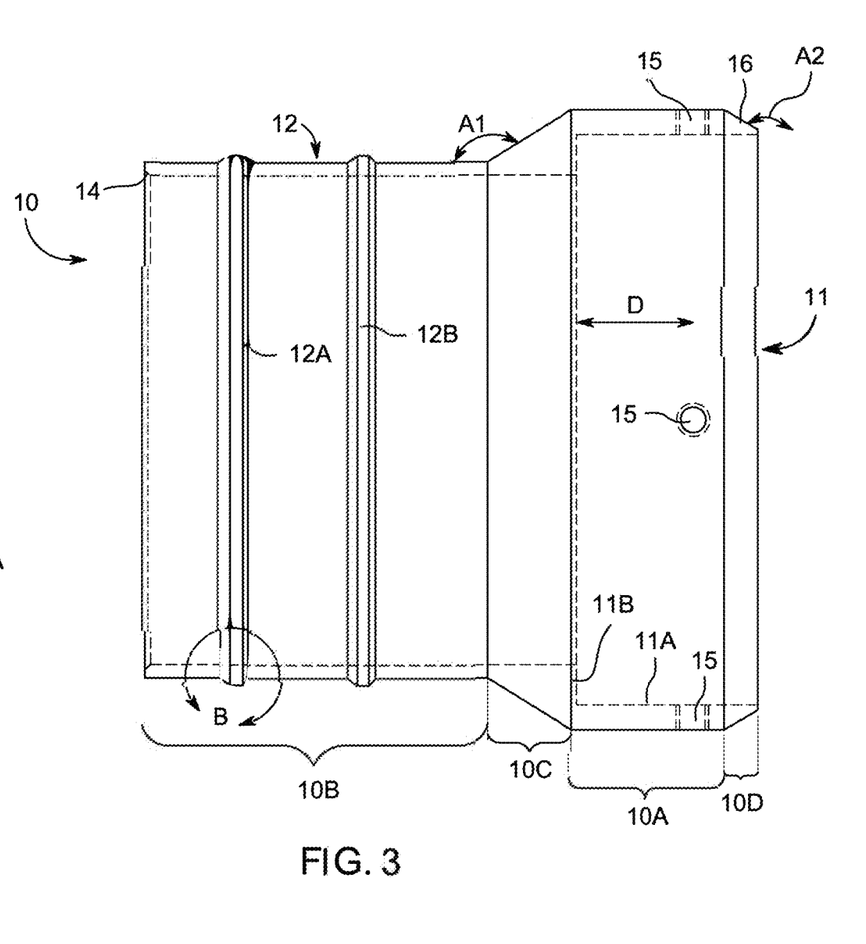
FIG. 3 depicts an embodiment of a female fitting of a hose connector with a radial hose for receiving a locking member and a female transition portion between the hose connection and the raised central portion and an end transition portion.
Figure 3A:
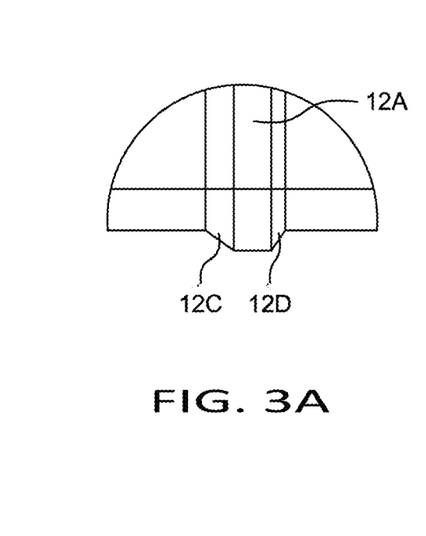
FIG. 3A is an exploded view of the portion B of FIG. 3.

As shown in FIG. 3, this embodiment comprises a corresponding female fitting 10. The corresponding female fitting 10 defines a female longitudinal through hole 11. The female fitting 10 may further comprise a female coupling portion 10A to receive the corresponding male coupling portion 20A and a second hose connection portion 10B for connecting to the second hose. The female fitting 10 also defines a radial through hole 15 through a wall of the female fitting 10 that forms a portion of the fitting locking assembly. The second hose connection portion 10B may be received within the second hose to connect the second hose to the female fitting. The first and second hoses may be secured to their corresponding hose connections by a hose clamp, wire, or other securing means. In another embodiment, the hose may be received within the hose connection portions and secured by other means.

Figure 4A:
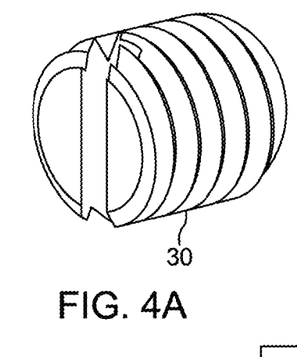
FIGS. 4A through 4C depict embodiments of locking members.
Figure 4B:
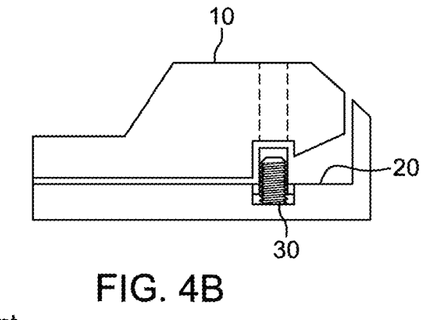
Figure 4C:
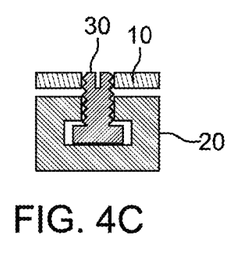
Figure 4D:
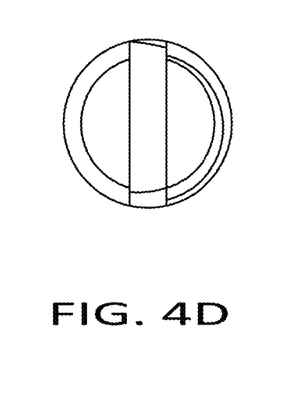
FIG. 4D depicts an end view of the locking member of FIG. 4A.
Figure 4E:
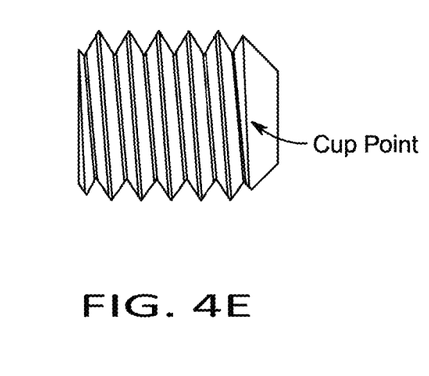
FIG. 4E depicts a side view of the locking member of FIG. 4A.
Figure 4F:
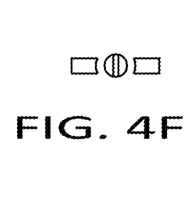
FIG. 4F depicts a top view of the locking member of FIG. 4C.

Embodiments of the hose connector may also comprise a locking assembly. In the embodiment shown in the figures, the locking assembly comprises a set screw, a radial recess in the female fitting, and a recess in the male fitting to receive the set screw. FIG. 4A depicts a threaded set screw as a locking member 30 for inserting and threading through the radial hole. FIG. 4B depicts a spring biased locking member 30 and FIG. 4C depicts a twist locking member 30 with tabs that are configured to lock with the recess in the male fitting.

In one embodiment, the fitting locking assembly comprises a locking member 30 configured to be received through the radial through hole 15 and into the recess 22 defined in the male fitting. The locking member 30 in this embodiment is a set screw 30 that is inserted into a treaded radial through hole 15 into the recess 22 thereby fastening the male fitting 20 to the female fitting 10 to prevent longitudinal movement of the male fitting 20 out of the female fitting 10. It was surprisingly found that only one locking member 15 is needed to connect and retain the connection of the male fitting 10 and the female fitting 20 as the hose is pressurized and used for mulch application. As shown in FIG. 1, in one embodiment, the recess 22 is a circumferential recess 22 around the male coupling portion to ease location and interaction of the recess 22 with the locking member 30. The recess may be any shape that allows the locking member to be received into the recess and retain the male fitting within the female fitting during use. For example, the cross-section of the channel may comprise a rectangular shape (as shown in the figures), curved walls or bottom, or a triangular shape, for example.

In another embodiment, the locking member is at least one of a bolt, a screw, a set screw, spring biased pin, a rod with a friction or interference fit, and twist lock fitting. In a specific embodiment, the locking member is a set screw and the radial through hole is a threaded radial through hole. The set screw may be threaded through the radial through hole with a least a portion of the set screw received with the recess in the male fitting. Preferably, the radial through hole is along a radius of the longitudinal through hole, but the radial through hole may be at other angles. For example, the radial through hole may be located on one of the transition portions and be perpendicular to a surface of the transition portion. Other configurations are also possible.

In still a further embodiment, the hose connection does not comprise significant exposed right angles or other features that can catch on obstacles as the hoses and hose connection(s) are dragged along the ground, over curbs and walls, and past other features during use. The hose connector may have a raised female connection portion 10A that has sloped transitional segments 10C and 10D on either side. These sloped (relative to the hose connection portions or an axis of the longitudinal through hole) transitional segments allow the hose connector to move past obstacles without becoming hung up.

In one embodiment, the outside diameter of the first hose connection portion 25 is smaller than an outside diameter of the male coupling portion 20A. The outside diameter of the second hose connection portion 12 is also smaller than an outside diameter of the female coupling portion 10A. The difference in diameters results in a raised central portion with the male fitting 20 inserted within the female fitting. For example, the male fitting 20 comprises a male transition portion 20C at an angle A3 greater than ninety degrees and less than one hundred and seventy degrees relative to the first hose connection portion or in another embodiment, angle A3 is greater than one hundred and fifteen degrees and less than one hundred and sixty degrees relative to the first hose connection portion.

Similarly, the female fitting 10 may comprise an end transition portion 10D that is adjacent to the male transition portion 20C when the male fitting 20 and the female fitting 10 are connected, and the angle A2 defining the end transition portion is within thirty degrees of the angle of A3 defined by the male transition portion 20C relative to the first hose connection portion 25.

Further, the female fitting 10 comprises a female transition portion 10C that defines an angle A1 that is greater than ninety degrees and less than one hundred and seventy degrees relative to the second hose connection portion 12.

In one embodiment, the male transition portion 20C of the male fitting has a similar slope (within 20 degrees) as the end transition portion 16 of the female fitting. In a specific embodiment, the male transition portion 20C of the male fitting has an identical slope (within 5 degrees) as the end transition portion 16 of the female fitting to allow a smooth transition when the male fitting is connected to the female fitting. The entrance of the through hole of the male fitting comprises an internal chamfer 24 and the entrance of the through hole of the female fitting comprises an internal chamfer 14.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

The invention claimed is:

1. A hose connector, comprising:
a male fitting connected to a first hose and defining a male longitudinal through hole, wherein the male fitting comprises a male coupling portion and a first hose connection portion received within the first hose and the male coupling portion defines a recess; and
a female fitting defining a female longitudinal through hole, wherein the female fitting comprises a second hose connection portion received within a second hose, a female coupling portion, and defines a radial through hole through a wall of the female fitting; and
a locking member configured to be received through the radial through hole and into the recess thereby fastening the male fitting to the female fitting, wherein an outside diameter of the first hose connection portion is smaller than an outside diameter of the male coupling portion, the male fitting comprises a male transition portion at an angle greater than ninety degrees and less than one hundred and seventy degrees relative to the first hose connection portion, and wherein the female fitting comprises a female end transition portion that is adjacent to the male transition portion when the male fitting and the female fitting are connected and an angle defined by the female end transition portion is within thirty degrees of the angle defined by the male transition portion.

2. The hose connector of claim 1, wherein the male coupling portion is received within the female coupling portion.

3. The hose connector of claim 1, wherein the recess is a circumferential recess around the male coupling portion.

4. The hose connector of claim 3, wherein a center-line of the circumferential recess aligns with a center line of the radial through hole when the female fitting is connected to the male fitting.

5. The hose connector of claim 1, wherein the locking member is one of a bolt, a screw, a set screw, spring biased pin, a rod with a friction or interference fit, twist lock member, and cam lock fittings.

6. The hose connector of claim 5, wherein a diameter of the locking member is less than a width of the recess such that the locking member may be received within the recess.

7. The hose connector of claim 1, wherein the male longitudinal through hole comprises a chamfer on an interior of the first hose connection portion.

8. The hose connector of claim 1, wherein the female longitudinal through hole comprises a chamfer on an interior of the second hose connection portion.

9. The hose connector of claim 1, wherein the locking member is a set screw and the radial through hole is a threaded radial through hole.

10. The hose connector of claim 1, a diameter of the second hose connection portion has a diameter that is smaller than a diameter of the female coupling portion.

11. A hose connector, comprising:
a male fitting connected to a first hose and defining a male longitudinal through hole, wherein the male fitting comprises a male coupling portion and a first hose connection portion received within the first hose and the male coupling portion defines a recess; and
a female fitting defining a female longitudinal through hole, wherein the female fitting comprises a second hose connection portion received within a second hose, a female coupling portion, and defines a radial through hole through a wall of the female fitting; and
a locking member configured to be received through the radial through hole and into the recess thereby fastening the male fitting to the female fitting, wherein an outside diameter of the first hose connection portion is smaller than an outside diameter of the male coupling portion, and the male fitting comprises a male transition portion at a first angle greater than one hundred and fifteen degrees and less than one hundred and sixty degrees relative to the first hose connection portion, and wherein the female fitting comprises a female end transition portion that is adjacent to the male transition portion when the male fitting and the female fitting are connected and an angle defined by the female end transition portion is within thirty degrees of the first angle.

12. The hose connector of claim 11, wherein the female connection portion comprises an end transition portion that is adjacent to the male transition portion when the male fitting and the female fitting are connected, and the end transition portion is within thirty degrees of the male transition portion relative to the first hose connection portion.

13. A hose connector, comprising:
a male fitting connected to a first hose and defining a male longitudinal through hole, wherein the male fitting comprises a male coupling portion and a first hose connection portion received within the first hose and the male coupling portion defines a recess; and
a female fitting defining a female longitudinal through hole, wherein the female fitting comprises a second hose connection portion received within a second hose, a female coupling portion, and defines a radial through hole through a wall of the female fitting; and
a locking member configured to be received through the radial through hole and into the recess thereby fastening the male fitting to the female fitting, wherein a diameter of the second hose connection portion has a diameter that is smaller than a diameter of the female coupling portion and the female fitting comprises a female end transition portion at an angle greater than ninety degrees and less than one hundred and seventy degrees relative to the second hose connection portion, and wherein the female end transition portion is adjacent to a male transition portion of the male fitting when the male fitting and the female fitting are connected and the first angle is within thirty degrees of an angle defined by the male transition portion.

14. A hose connector, comprising:
a male fitting connected to a first hose and defining a male longitudinal through hole, wherein the male fitting comprises a male coupling portion and a first hose connection portion received within the first hose and the male coupling portion defines a recess; and a female fitting defining a female longitudinal through hole, wherein the female fitting comprises a second hose connection portion received within a second hose, a female coupling portion, and defines a radial through hole through a wall of the female fitting; and a locking member configured to be received through the radial through hole and into the recess thereby fastening the male fitting to the female fitting, wherein a diameter of the second hose connection portion has a diameter that is smaller than a diameter of the female coupling portion and the female fitting comprises a female transition end portion at a first angle greater than one hundred and fifteen degrees and less than one hundred and sixty degrees relative to the second hose connection portion, and wherein the female end transition portion is adjacent to a male transition portion of the male fitting when the male fitting and the female fitting are connected and the first angle is within thirty degrees of an angle defined by the male transition portion.

* * * * *